United States Patent
Navarro

(10) Patent No.: US 10,505,389 B2
(45) Date of Patent: Dec. 10, 2019

(54) UPS SYSTEMS AND METHODS USING DUAL MODE RECTIFIER/INVERTER

(71) Applicant: Eaton Intelligent Power Limited, Dublin (IE)

(72) Inventor: George Authur Navarro, Raleigh, NC (US)

(73) Assignee: Eaton Intelligent Power Limited (IE)

( * ) Notice: Subject to any disclaimer, the term of this patent is extended or adjusted under 35 U.S.C. 154(b) by 46 days.

(21) Appl. No.: 15/728,656

(22) Filed: Oct. 10, 2017

(65) Prior Publication Data
US 2018/0034315 A1    Feb. 1, 2018

Related U.S. Application Data

(63) Continuation of application No. 13/935,533, filed on Jul. 4, 2013, now Pat. No. 9,806,561.

(51) Int. Cl.
| | |
|---|---|
| H02J 9/06 | (2006.01) |
| H02J 9/00 | (2006.01) |
| H02J 9/04 | (2006.01) |

(52) U.S. Cl.
CPC ............... *H02J 9/061* (2013.01); *H02J 9/00* (2013.01); *H02J 9/04* (2013.01); *Y02P 80/11* (2015.11); *Y10T 307/615* (2015.04)

(58) Field of Classification Search
CPC ............. H02J 9/00; H02M 5/458; H02M 5/45
(Continued)

(56) References Cited

U.S. PATENT DOCUMENTS

| | | | | |
|---|---|---|---|---|
| 5,978,236 A | * | 11/1999 | Faberman | H02J 9/061 307/66 |
| 6,295,215 B1 | * | 9/2001 | Faria | H02J 9/062 363/124 |

(Continued)

FOREIGN PATENT DOCUMENTS

| | | |
|---|---|---|
| CN | 1713480 | 12/2005 |
| CN | 201032693 | 3/2008 |
| EP | 1 835 594 A2 | 9/2007 |

OTHER PUBLICATIONS

Chinese Office Action; corresponding CN Appln. No. 2017103102998390; dated Nov. 3, 2017 (17 pages).
(Continued)

*Primary Examiner* — Fritz M Fleming
*Assistant Examiner* — Jagdeep S Dhillon
(74) *Attorney, Agent, or Firm* — Stanek Lemon Crouse & Meeks

(57) ABSTRACT

An uninterruptible power supply (UPS system) includes a first converter circuit, a second converter circuit and a DC bus coupled to the first and second converter circuits. The system further includes a control circuit configured to control the first and second converter circuits and to selectively couple the first and second converter circuits to an AC source and a load to provide a first mode of operation wherein the first and second converter circuits respectively operate as a rectifier and an inverter to serve the load from the AC source and a second mode of operation wherein the first and second converter circuits operate as parallel inverters to serve the load from the DC bus. The control circuit may be configured to couple the AC source to the load to bypass the first and second converter circuits in a third mode of operation.

11 Claims, 6 Drawing Sheets

(58) Field of Classification Search
USPC .................................. 307/64, 66; 363/34, 37
See application file for complete search history.

(56) References Cited

U.S. PATENT DOCUMENTS

| | | | |
|---|---|---|---|
| 7,050,312 B2 | 5/2006 | Tracy et al. | |
| 7,560,831 B2 | 7/2009 | Whitted et al. | |
| 7,886,173 B2 | 2/2011 | Krieger et al. | |
| 8,344,546 B2 | 1/2013 | Sarti | |
| 8,897,041 B2 * | 11/2014 | Taddeo | H02M 1/10 363/123 |
| 9,106,103 B2 | 8/2015 | Paulakonis | H02J 7/345 307/66 |
| 9,118,206 B2 * | 8/2015 | Peterson | H01H 11/00 |
| 2004/0085785 A1 * | 5/2004 | Taimela | H02J 3/32 363/37 |
| 2005/0201127 A1 | 9/2005 | Tracy et al. | |
| 2007/0216228 A1 | 9/2007 | Johnson, Jr. et al. | |
| 2008/0265681 A1 | 10/2008 | Pfitzer | G01R 31/40 307/65 |
| 2009/0021079 A1 | 1/2009 | Johnson, Jr. et al. | |
| 2010/0008397 A1 | 1/2010 | Johnson, Jr. | G01K 13/00 374/152 |
| 2010/0110731 A1 | 5/2010 | Murai | |
| 2012/0068541 A1 | 3/2012 | Anderson | H02J 9/061 307/66 |
| 2012/0074786 A1 | 3/2012 | Johnson, Jr. | H02J 9/062 307/66 |
| 2012/0306274 A1 | 12/2012 | Shetler, Jr. et al. | |
| 2013/0027077 A1 | 1/2013 | Oughton, Jr. | G01R 31/40 324/764.01 |
| 2013/0076141 A1 * | 3/2013 | Paulakonis | H02J 7/345 307/66 |
| 2013/0193874 A1 | 8/2013 | Takahashi | G05F 1/468 315/297 |
| 2014/0354056 A1 | 12/2014 | Chen | H02M 5/458 307/52 |

OTHER PUBLICATIONS

International Search Report and Written Opinion Corresponding to International Application No. PCT/US2014/045214; dated: Oct. 16, 2014; 13 Pages.

International Preliminary Report on Patentability Corresponding to International Application No. PCT/US2014/045214; dated: Jan. 14, 2016; 10 Pages.

* cited by examiner

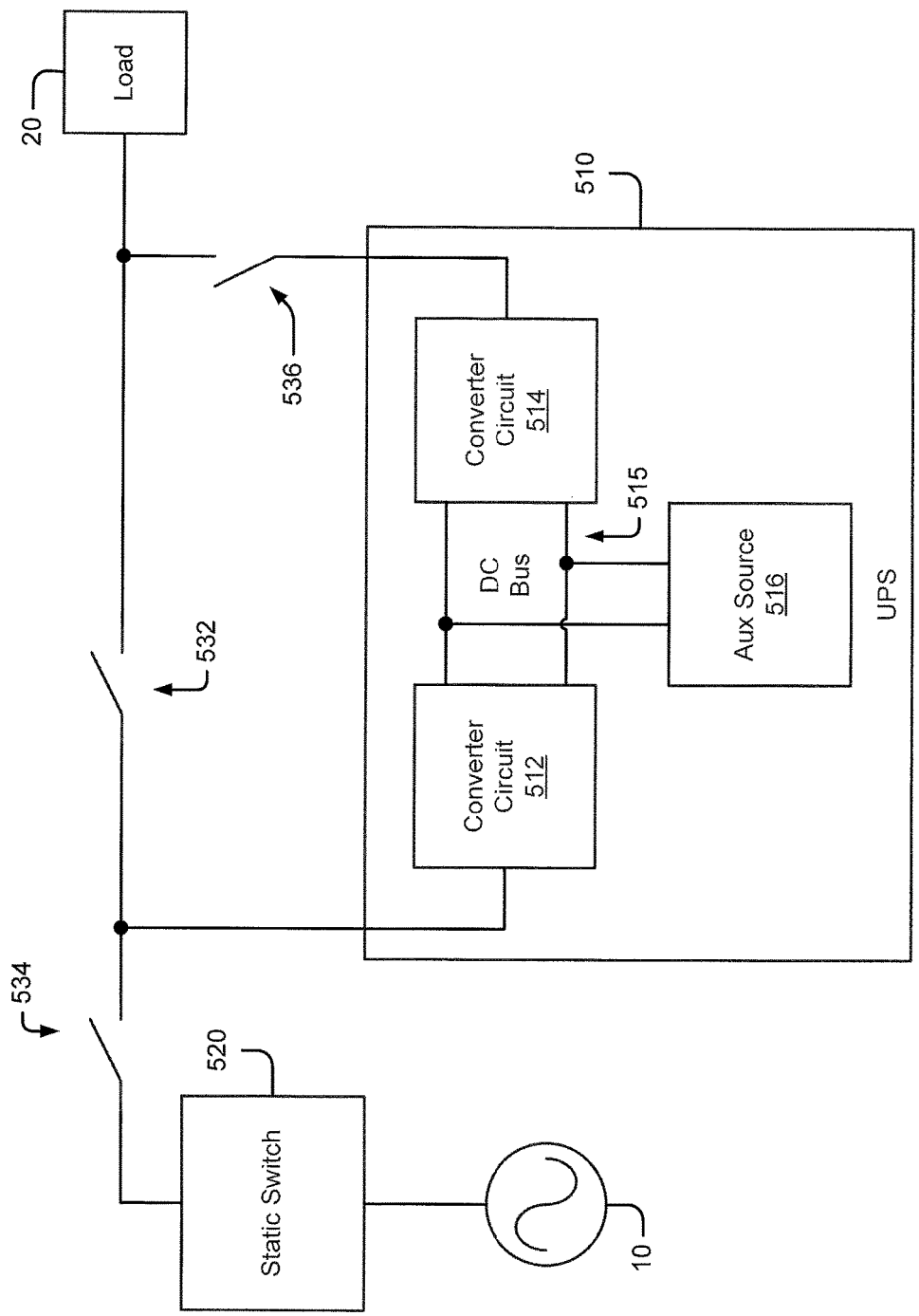

UPS SYSTEMS AND METHODS USING DUAL MODE RECTIFIER/INVERTER

CROSS-REFERENCE TO RELATED APPLICATION

This application is a continuation of U.S. patent application Ser. No. 13/935,533, filed Jul. 4, 2013, the contents of which is hereby incorporated herein by reference in its entirety.

BACKGROUND

The inventive subject matter relates to power conversion apparatus and methods and, more particularly, to uninterruptible power supply (UPS) apparatus and methods.

UPS systems are commonly used in installations such as data centers, medical centers and industrial facilities. UPS systems may be used in such installations to provide backup power to maintain operation in event of failure of the primary utility supply.

Large data centers have proliferated with the advent of web services and cloud computing. Some newer large data centers occupy millions of square feet and house hundreds of thousands of servers. Typically powered by the local grid, these centers may include backup power supply systems including UPSs and diesel-electric backup generators to support continued operation when utility power is lost. Energy consumption is a major concern for such facilities, as some facilities are approaching the 100 MW level. For such facilities, even a few percentage points of efficiency can translate into significant expense.

Large UPS systems, such as those used in data center applications, commonly use a "double conversion" architecture wherein power is transferred via a rectifier and inverter coupled by an intermediate DC bus. Operation of such a power train can introduce losses. Accordingly, some double-conversion UPS systems support high-efficiency or "eco" modes in which the rectifier and inverter are bypassed when the input AC source meets certain criteria. Other solutions to increase data center energy efficiency, such as those described, for example, in U.S. Pat. No. 7,886,173 to Krieger et al., U.S. Pat. No. 7,560,831 to Whitted et al. and U.S. Pat. No. 8,344,546 to Sarti, include redundant power distribution techniques that avoid the use of traditional UPS architectures.

SUMMARY

Some embodiments of the inventive subject matter provide an uninterruptible power supply (UPS system) including a first converter circuit, a second converter circuit and a DC bus coupled to the first and second converter circuits. The system further includes a control circuit configured to control the first and second converter circuits and to selectively couple the first and second converter circuits to an AC source and a load to provide a first mode of operation wherein the first and second converter circuits respectively operate as a rectifier and an inverter to serve the load from the AC source and a second mode of operation wherein the first and second converter circuits operate as parallel inverters to serve the load from the DC bus. The control circuit may be configured to couple the AC source to the load to bypass the first and second converter circuits in a third mode of operation.

In some embodiments, the control circuit transitions between the first and third modes based on a voltage of the AC source. For example, the control circuit may transition to the first mode responsive to the voltage of the AC source deviating outside of a predetermined range. The control circuit may maintain a voltage at the load within the predetermined range when operating in the first mode. The control circuit may prioritize conversion efficiency over maintenance of a nominal voltage at the load when operating in the first mode.

In some embodiments, the system may include a first switch configured to couple a first port of the first converter circuit and the AC source and a second switch configured to coupled and decouple the first port of the first converter circuit and the load. The DC bus may be coupled between second ports of the first and second converter circuits. The control circuit may be configured to close the first switch and open the second switch to support the first mode of operation and to open the first switch and close the second switch to support the second mode of operation. The control circuit may be configured to close the first and second switches to support the third mode of operation.

Further embodiments provide a system including a UPS including an AC input, an AC output, a first converter circuit having a first port configured to be coupled to the AC input, a second converter circuit having a first port configured to be coupled to the AC output and a DC bus coupling second ports of the first and second converter circuits. The system also includes a switch configured to couple the AC input and the AC output of the UPS and a static switch configured to couple an AC source and the AC input of the UPS. The system further includes a control circuit configured to control the UPS, the switch and the static switch responsive to a state of the AC source.

The control circuit may be configured provide a first mode of operation wherein the first and second converter circuits respectively operate as a rectifier and inverter coupled between the AC input and the AC output and a second mode of operation wherein the first and second converter circuits operate as parallel inverters coupled between the DC bus and the AC output. The control circuit may be configured to close the switch to bypass the first and second converter circuits in a third mode of operation. The control circuit may be configured to transition between the first and third modes based on a voltage of the AC source. The control circuit may prioritize conversion efficiency over voltage regulation when operating in the first mode.

Still further embodiments provide a UPS system including a plurality of UPS module locations configured for installation of UPS modules and at least one UPS module installed in at least one of the UPS module locations. The at least one UPS module includes an AC input, an AC output, a first converter circuit having a first port configured to be coupled to the AC input, a second converter circuit having a first port configured to be coupled to the AC output, a DC bus coupling second ports of the first and second converter circuits, and a switch configured to couple the AC input and the AC output. The UPS system further includes a static switch configured to couple an AC source and the AC input of the at least one UPS module.

In some embodiments, the at least one UPS module may be configured provide a first mode of operation wherein the first and second converter circuits respectively operate as a rectifier and inverter coupled between the AC input and the AC output and a second mode of operation wherein the first and second converter circuits operate as parallel inverters coupled between the DC bus and the AC output. The at least one UPS module may be configured to close the switch to bypass the first and second converter circuits in a third mode of operation.

In some embodiments, the switch includes a first switch and the at least one UPS module further includes a second switch configured to couple the first port of the second converter circuit and the AC output. The system may further include a third switch configured to couple the static switch and the AC input of the at least one UPS module.

BRIEF DESCRIPTION OF THE DRAWINGS

FIG. 5B is a schematic diagram illustrating a UPS system according to some embodiments.

DETAILED DESCRIPTION

Figure 1:
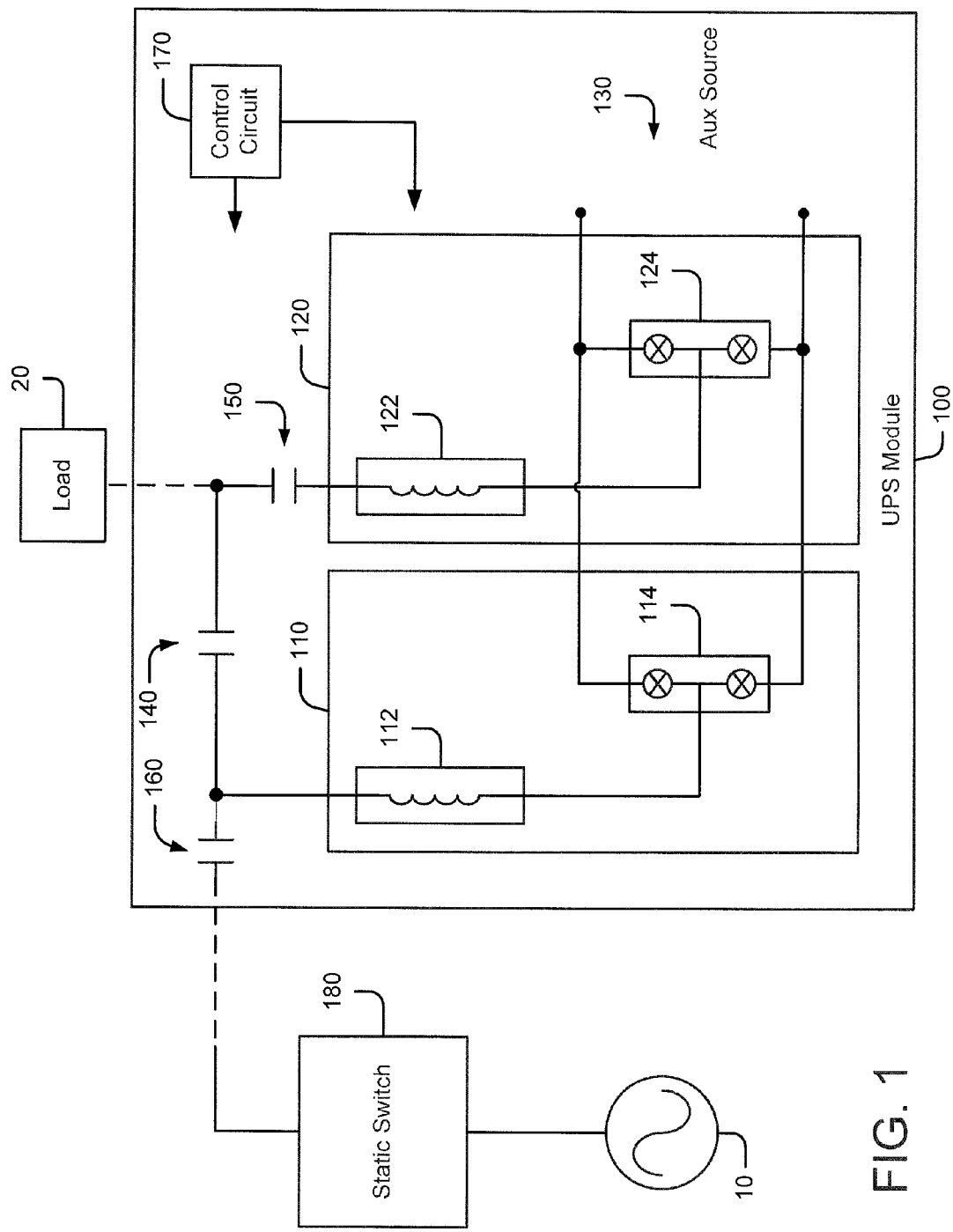
FIG. 1 is a schematic diagram illustrating a UPS system according to some embodiments.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 2:
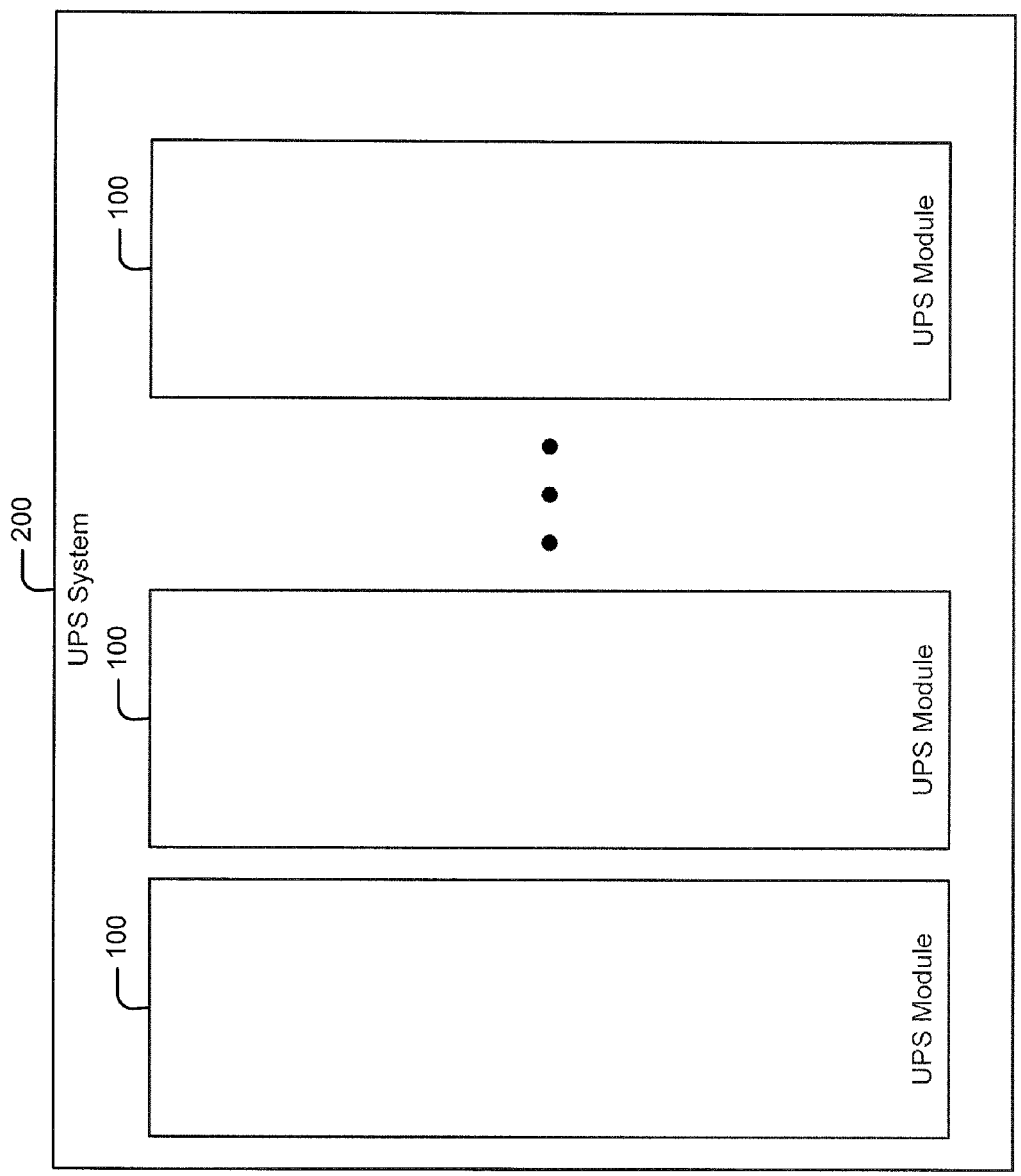
FIG. 2 is a schematic diagram illustrating a modular UPS system according to some embodiments.
Figure 3:
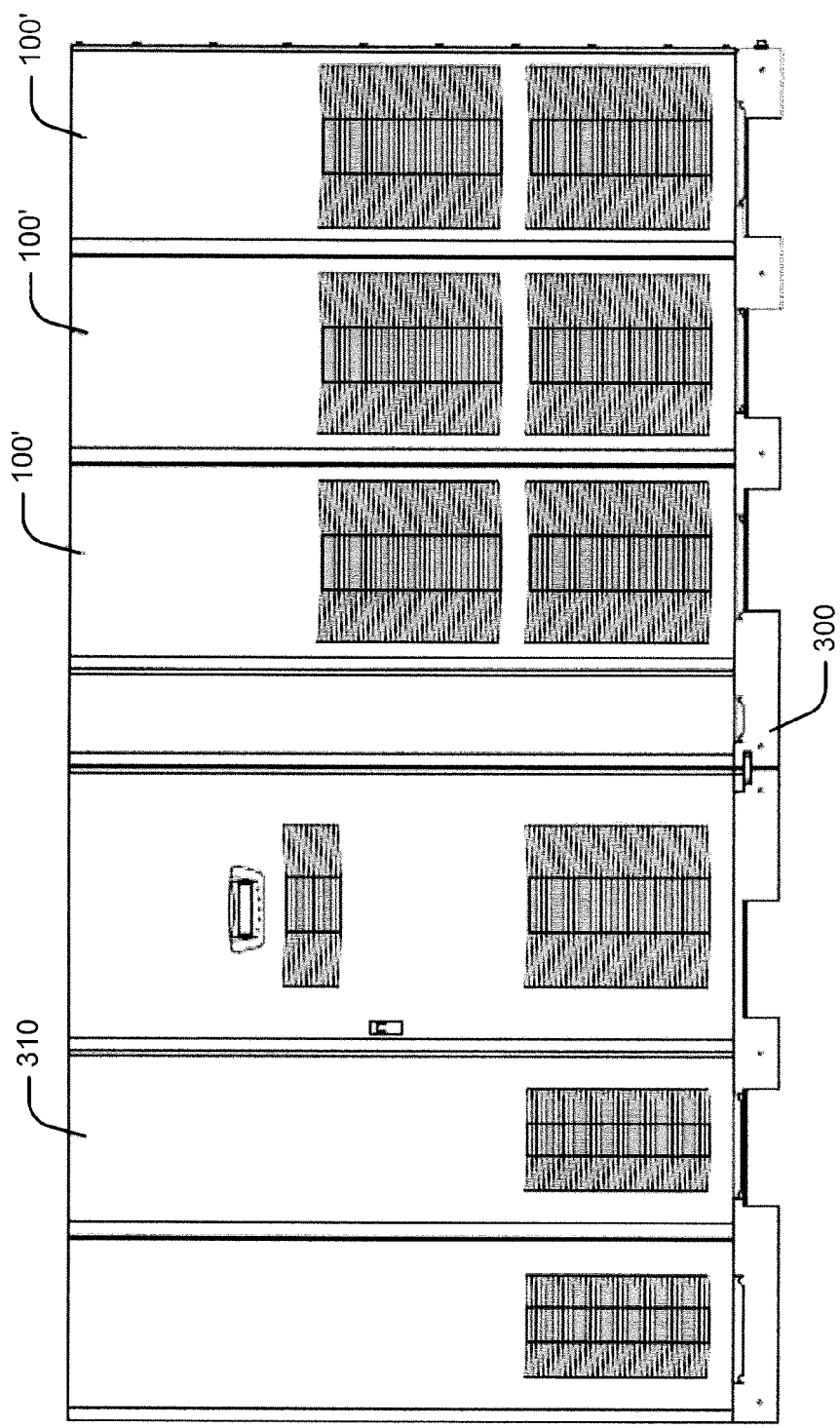
FIG. 3 is a front elevation view of a modular UPS system according to some embodiments.

FIG. 1 illustrates a UPS system according to some embodiments of the inventive subject matter. The system includes a UPS, here shown as a UPS module 100 as might be employed in a modular UPS system. The UPS module 100 has an AC input configured to receive power from an AC source 10 via a static switch 180 and an AC output configured to be coupled to a load 20. Referring to FIG. 2, a UPS system 200 may include multiple ones of such UPS modules 100. For example, as shown in FIG. 3, UPS modules 100 may comprise respective modular cabinets configured to be joined to form an integrated UPS system 300. The UPS system 300 may include additional components, such as may be housed in one or more additional cabinets 310. Such components may include, for example, monitoring, communication and user interface circuitry, static switches (e.g., the static switch 180 of FIG. 1), circuit breakers, and the like. It will be appreciated that modular physical configurations other than that illustrated in FIG. 3 may be used in some embodiments. For example, rather than employing cabinets that are configured to be joined together as shown in FIG. 3, a modular UPS system accordingly to some embodiments may include a system chassis or similar structure configured to receive UPS modules and other components in defined slots, compartments and/or other structures of the chassis.

Referring again to FIG. 1, the UPS module 100 includes first and second power converter circuits 110, 120. The UPS module 100 further includes a first switch, e.g., a first contactor 140, coupled to a first port of the first converter circuit 110 and configured to selectively bypass the first converter circuit 110. A second switch, e.g., a second contactor 150, is configured to selectively couple a first port of the second converter circuit 120 and the AC output of the UPS module 100. A third switch, e.g., a third contactor 160, is configured to selectively couple the first converter circuit 110 and the static switch 180. The first and second power converter circuits 110, 120 have second ports that are coupled by a DC bus 130. The DC bus 130 may be also connected, for example, to a battery or other auxiliary power source.

The first power converter circuit 110 includes an inductor assembly 112 and a bridge circuit 114. The second power converter circuit 124 includes an inductor assembly 122 and a bridge circuit 124. It will be appreciated that the first and second power converter circuits 110, 120 may be multiphase (e.g., three phase) converters, and that the inductor assemblies 112, 114 may include multiple phases and the bridge circuits 114, 124 may include, for example, multiple half-bridge phase legs employing IGBTs, FETS or other switching devices.

A control circuit 170 controls operations of the first and second converter circuits 110, 120 and the first, second and third switches 140, 150, 160. In particular, the control circuit 170 may be configured to operate the first and second converter circuits 110, 120 and the first, second and third switches 140, 150, 160 to support multiple modes of operation based on the state of the AC source 10. For example, when the AC source 10 meets one or more power quality criteria, the control circuit 170 may close the first contactor 140 and the third contactor 160 such that power flows from the static switch 180, though the first and third contactors 140, 160 and directly to the AC output of the UPS module 100 without passing through the converter circuits 110, 120. When the AC source 10 is still operational but fails to meet the one or more power quality criteria, e.g., when the AC source 10 has a low or high voltage level, the control circuit 170 may open the first contactor 140 and operate the first converter circuit 110 and the second converter circuit 120 as a rectifier and inverter, respectively, to provide a double-conversion (on-line) operational mode that enables regulation of the output to the load 20. When the AC source 10 fails or is disconnected, the control circuit 170 may close the first and second contactors 140, 150, open the third contactor 160 and operate the first and second converter circuits 110, 120 as parallel inverters, driving the load 20 from the DC bus 140 and the auxiliary source coupled thereto. Such operations are described in greater detail below.

It will be understood that the control circuit 170 may, in general, include analog circuitry, digital circuitry (including microprocessors, microcontrollers or similar data processing devices) and/or combinations thereof. The control circuit 170 may be included in the UPS module 100 and/or may be positioned elsewhere in the UPS assembly. It will be further understood that, although FIG. 1 illustrates the use of contactors 140, 150, 160, other types of mechanical and/or solid state switches may be used.

Figure 4:
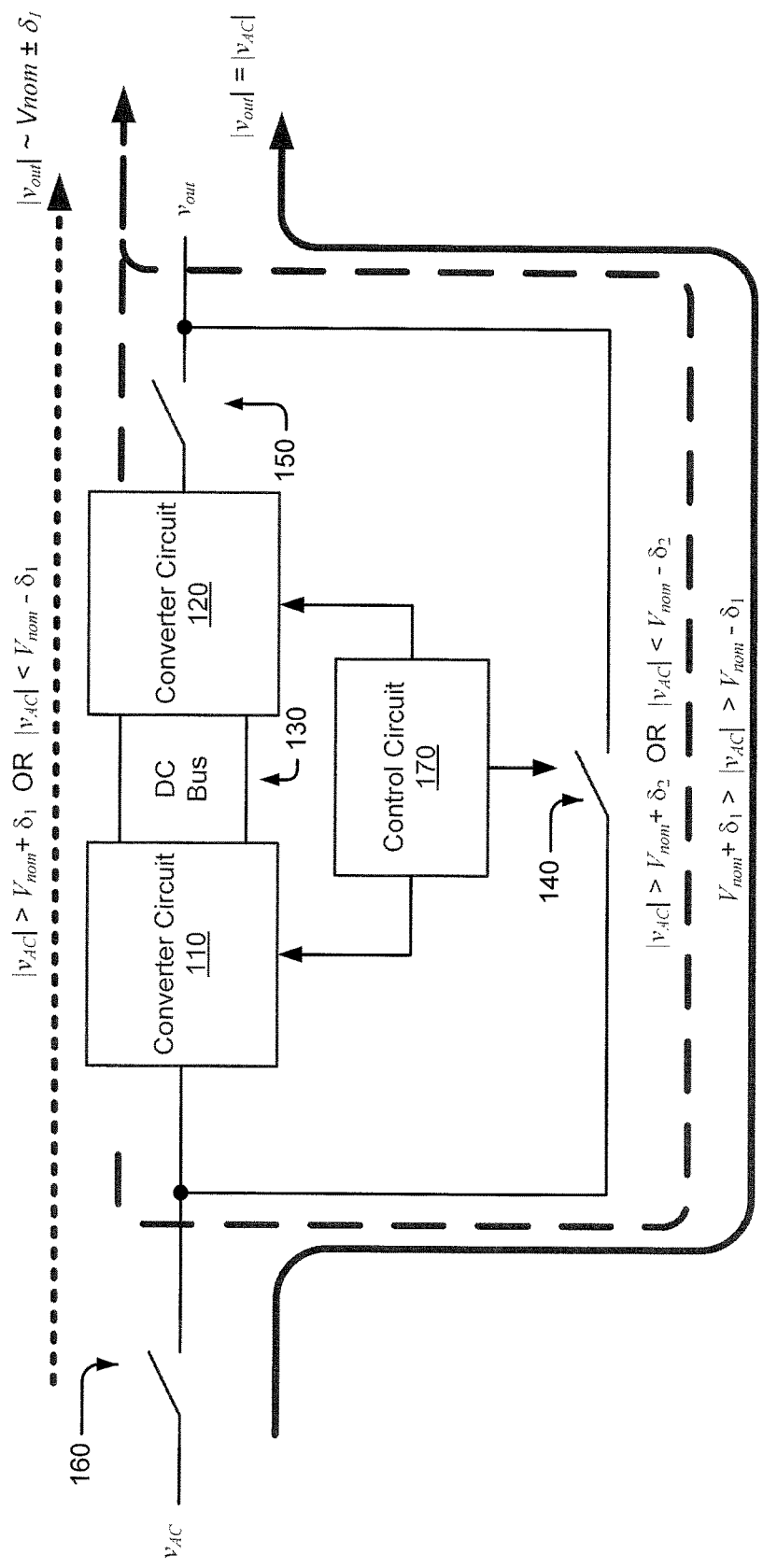
FIG. 4 is a schematic diagram of a UPS system illustrating various operational modes according to some embodiments.

According to some embodiments of the inventive subject matter, a UPS architecture along the lines described above may be used to provide flexibility among operating modes and allow for more efficient energy use while still providing desired redundancy. FIG. 4 provides a functional depiction of the circuitry of FIG. 1. In a first "direct" mode of operation, the first and third switches 140, 160 are closed and power may flow through the first switch 140, bypassing the first and second converter circuits 110, 120 and thus providing a relatively low loss power transfer pathway. Such a mode may be appropriate, for example, when the magnitude of the AC input voltage $v_{AC}$ (e.g., from the static switch 180) is within a predetermined range, for example, a deviation $\pm\delta_1$ with respect to a desired nominal voltage level $V_{nom}$ for the AC output voltage $v_{out}$. In this mode, the second switch 150 may also be closed to allow the second converter circuit 120 to remain in a "live standby" state in which drive signals to the bridge transistors of the second converter circuit 120 may be disabled to provide a high output impedance while the second converter circuit 120 is otherwise active and ready to be activated nearly instantaneously by enabling the bridge transistor drive signals. In some embodiments, such a direct mode may include operating the second converter circuit 120 to provide harmonic suppression, phase balancing, reactive power compensation and the like.

When the AC input voltage vAC is out of the range defined for the direct mode of operation (e.g., $V_{nom}\pm\delta_1$) but still within a range that allows for continues provision of power from the AC source (e.g., a range $V_{nom}+\delta_2$ that encompasses high and low line voltage conditions), the system may transition to a relatively less efficient double conversion mode. In the double-conversion mode, the first switch 140 is open, the second and third switches 150, 160 are closed and the first and second converter circuits 110, 120 operate as a rectifier and inverter, respectively. This mode may involve operating the first and second converter circuits 110, 120 to regulate the AC output voltage vout to substantially the desired nominal voltage level $V_{nom}$. However, in some embodiments, the first and second converter circuits 110, 120 may be operated in this mode to prioritize energy conversion efficiency while maintaining the AC output voltage $v_{out}$ within, for example, the same operating voltage range (e.g., $V_{nom}\pm\delta_1$) defined for the direct mode. Allowing the AC output voltage $v_{out}$ to vary within this range may, for example, allow use of minimal boost in the rectification operations of the first converter circuit 110 and/or other operations of the first and second converter circuits 110, 120 that potentially reduce switching and other losses.

When the AC input voltage vAC is out of the range (e.g., $V_{nom}\pm\delta_2$) for double-conversion operation, for example, when the AC source completely fails, the system may transition to a third mode of operation in which the first and second switches 140, 150 are closed and the first and second converter circuits 110, 120 are operated as parallel inverters, driving the load with power from the DC bus 130. In this mode, the third switch 160 may be opened to prevent backfeed (e.g., to the static switch 180 of FIG. 4). In this mode, the first and second converter circuits 110, 120 may be operated, for example, to maintain the AC output voltage $v_{out}$ within in a desired range (e.g., the range $V_{nom}\pm\delta_1$) while optimizing battery life.

It will be appreciated that these modes may be used to support various other scenarios. In a generator walk-in scenario, for example, the static switch 180 illustrated in FIG. 1 may be fed by a transfer switch that selectively couples a utility source or a local generator (e.g., a diesel or natural gas generator) to the static switch 180. Upon failure of the utility, the generator may be started and the transfer switch actuated to switch to the generator. However, there may be a significant lag in bringing the generator up to speed and stabilizing the output of the generator once connected to the load. To carry the load through this delay, the UPS system may transition to the parallel-inverter mode upon failure of the utility, and then sequentially transition to the double-conversion mode and ultimately to the direct mode as the generator output stabilizes. The system can also transition between the direct and double conversion modes based on the quality of the generator output.

Figure 5A:
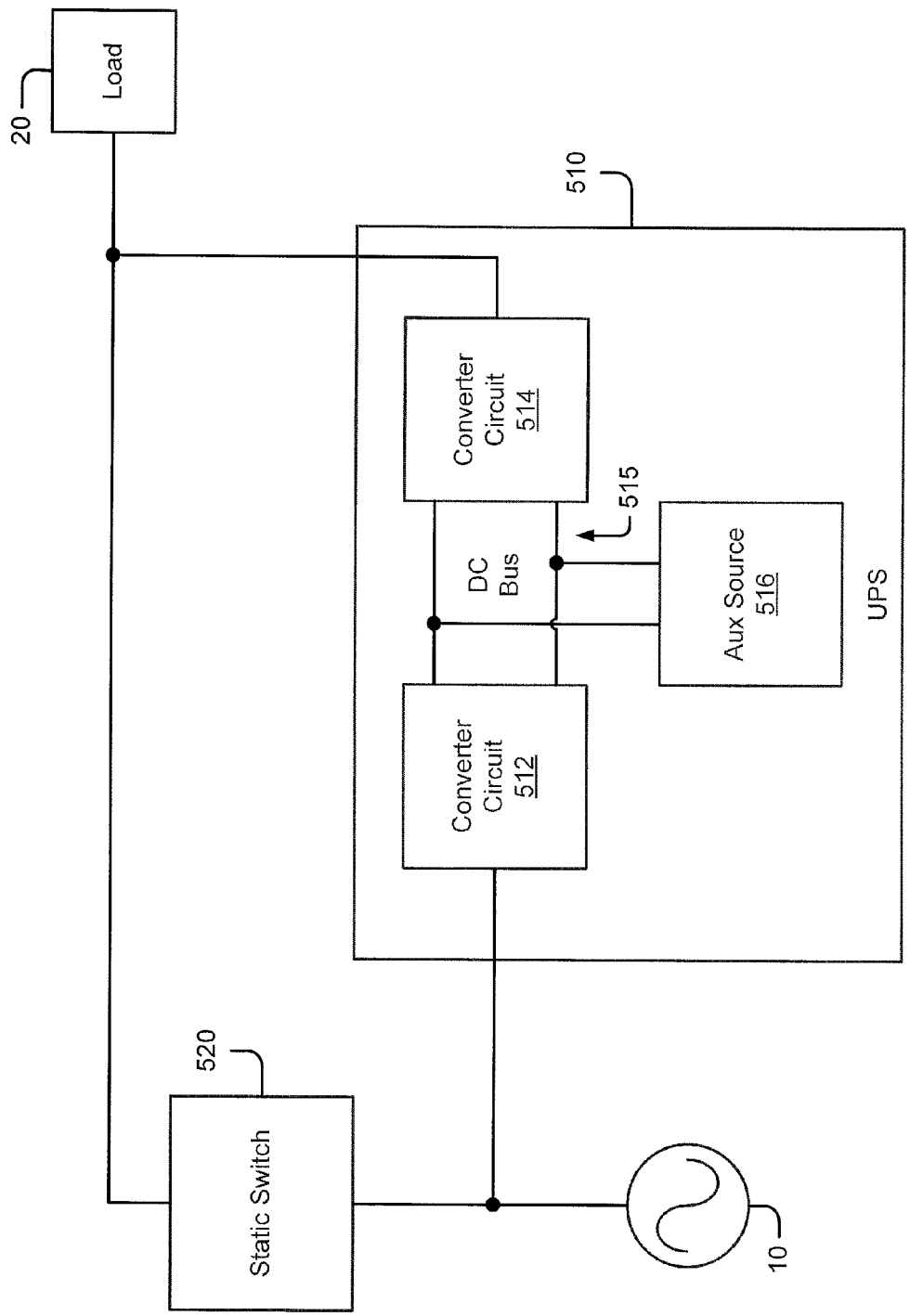
FIG. 5A is a schematic diagram illustrating a conventional UPS system configuration.

According to further embodiments, existing UPS arrangements employing static switches and double conversion converter chains may be retrofitted or otherwise modified to provide a system along the lines described above. For example, referring to FIG. 5A, an existing system may include a UPS 510 including a first converter circuit 512, a second converter circuit 514, a DC bus 515 coupled to the first and second converter circuits 512, 514, and an auxiliary source (e.g., a battery converter and battery) 516 coupled to the DC bus 515. A static switch 520 is configured to provide a bypass for the UPS 510.

According to some embodiments, such an arrangement may be modified to include first, second and third switches 532, 534, 536 arranged as illustrated in FIG. 5B. This configuration may be used to support functionality along the lines described with reference to FIGS. 1-4. It will be appreciated that the switches 532, 524, 536 may be contactors, solid-state switches and/or other switching devices. The switches 532, 534, 536 may be existing switches of the UPS system repurposed to provide the connectivity show and/or may be an external switches added to the system. It will be further appreciated that control circuitry of the UPS 510 and/or the static switch 520 may be modified to support the modified functionality.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A method of modifying a power system comprising an uninterruptible power supply (UPS) comprising an AC input coupled to an AC source by a static switch, an AC output coupled to a load and coupled to the AC source by the static switch, a first converter circuit having a first port configured to be coupled to the AC input, a second converter circuit having a first port configured to be coupled to the AC output and a DC bus coupling second, ports of the first and second converter circuits, the method comprising:

disconnecting the AC input and the AC output of the UPS from the static switch;

connecting a first terminal of a first switch external to the UPS to the AC input of the UPS;

connecting a first terminal of a second switch external to the UPS to the static switch;

connecting a second terminal of the second switch, to the AC input of the UPS;

connecting a first terminal of a third switch external to the UPS to the AC output of the UPS;

connecting a second terminal of the third switch to a second terminal of the first switch; and controlling the UPS, the first switch, the second switch, and the third switch to provide a first mode of operation wherein the first and second converter circuits respectively operate as a rectifier and inverter coupled between the AC input and the AC output and a second mode of operation wherein the first and second converter circuits operate as parallel inverters coupled between the DC bus and the AC output.

2. The method of claim 1, wherein the first switch is open and the second switch is closed in the first mode of operation and wherein the first switch is closed and the second switch is open in the second mode of operation.

3. The method of claim 1, further comprising controlling the UPS, the first switch, the second switch, and the third switch to provide a third mode of operation in which the AC source is coupled to the AC output via the first and second switches to bypass the first and second converter circuits.

4. The method of claim 3, further comprising closing the third switch in the third mode.

5. The method of claim 4, further comprising disabling bridge transistor drive signals for the second converter circuit in the third mode.

6. The method of claim 4, further comprising operating the second converter circuit to provide harmonic suppression, phase balancing and/or reactive power compensation in the third mode.

7. The method of claim 1, wherein controlling the UPS, the first switch, the second switch, and the third switch to provide a first mode of operation wherein the first and second converter circuits respectively operate as a rectifier and inverter coupled between the AC input and the AC output and a second mode of operation wherein the first and second converter circuits operate as parallel inverters coupled between the DC bus and the AC output is preceded by modifying control circuitry of the UPS to support the first and second modes of operation.

8. A method of modifying a power system including a UPS having an AC input coupled to an AC source by a static switch, an AC output coupled to a load and coupled to the AC source by the static switch, a first converter circuit having a first port configured to be coupled to the AC input, a second converter circuit having a first port configured to be coupled to the AC output and a DC bus coupling second ports of the first and second converter circuits, the method comprising:

disconnecting the AC input and the AC output of the UPS from the static switch;

connecting a first terminal of a first switch external to the UPS to the AC input of the UPS;

connecting a first terminal of a second switch external to the UPS to the static switch;

connecting a second terminal of the second switch to the AC input of the UPS and the first terminal of the first switch;

connecting a first terminal of a third switch to the AC output of the UPS;

connecting a second terminal of the third switch to a second terminal of the first switch and a load; and modifying control circuitry of the UPS to support a mode of operation wherein the first, second, and third switches are closed and the converter circuit operates concurrently with provision of power to the load from the AC source via the first and second switches.

9. The method of claim 8, further comprising modifying the control circuitry of the UPS to support a first mode of operation wherein the first and second converter circuits respectively operate as a rectifier and inverter coupled between the AC input and the AC output and a second mode of operation wherein the first and second converter circuits operate as parallel inverters coupled between the DC bus and the AC output.

10. The method of claim 9, wherein the first switch is open and the second switch is closed in the first mode of operation and wherein the first switch is closed and the second switch is open in the second mode of operation.

11. The method of claim 9, further comprising modify the control circuitry of the UPS to support a third mode of operation in which the AC source is coupled to the AC output via the first and second switches to bypass the first and second converter circuits.

\* \* \* \* \*

UNITED STATES PATENT AND TRADEMARK OFFICE
CERTIFICATE OF CORRECTION

PATENT NO. : 10,505,389 B2  
APPLICATION NO. : 15/728656  
DATED : December 10, 2019  
INVENTOR(S) : George Arthur Navarro Page 1 of 1

It is certified that error appears in the above-identified patent and that said Letters Patent is hereby corrected as shown below:

On the Title Page

Item [72], delete "Authur" and insert -- Arthur --.

In the Claims

Column 7, Line 2, Claim 1 delete "second, ports" and insert -- second ports --.
Column 7, Line 10, Claim 1 delete "switch, to" and insert -- switch to --.
Column 8, Line 43, Claim 11 delete "modify" and insert -- modifying --.

Signed and Sealed this
Eighteenth Day of February, 2020

Andrei Iancu
*Director of the United States Patent and Trademark Office*